US012693533B2

(12) United States Patent
Le et al.

(10) Patent No.: US 12,693,533 B2
(45) Date of Patent: Jul. 28, 2026

(54) ACHROMATIC LENS INCLUDING FRESNEL OPTICAL ELEMENT FOR NEAR EYE DISPLAY

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 389 days.

(21) Appl. No.: 18/143,484

(22) Filed: May 4, 2023

(65) Prior Publication Data

US 2024/0369836 A1     Nov. 7, 2024

(51) Int. Cl.
*G02B 27/01* (2006.01)
*G02B 3/08* (2006.01)
*G02B 27/00* (2006.01)

(52) U.S. Cl.
CPC ........... *G02B 27/0172* (2013.01); *G02B 3/08* (2013.01); *G02B 27/0025* (2013.01); *G02B 2027/011* (2013.01)

(58) Field of Classification Search
CPC .... G02B 5/1876; G02B 3/08; G02B 27/4205; G02B 27/4216; G02B 27/4211; G02B 27/0101; G02B 27/0056; G02B 27/005; G02B 27/0037; G02B 27/0025; G02B 2027/0116; G02B 2027/0112;
(Continued)

(56) References Cited

U.S. PATENT DOCUMENTS 6,266,191 B1 *   7/2001   Abe ................... G02B 27/4211
                                              359/569
9,733,485 B2     8/2017   Lin et al.
(Continued)

FOREIGN PATENT DOCUMENTS

WO        2022/053891 A1     3/2022

OTHER PUBLICATIONS

Frisen, Lars, and Anders Glansholm. "Optical and neural resolution in peripheral vision." Investigative Ophthalmology & Visual Science 14.7 (1975): 528-536.
(Continued)

*Primary Examiner* — Travis S Fissel
(74) *Attorney, Agent, or Firm* — ArentFox Schiff LLP

(57)     ABSTRACT

Aspects of the disclosure provide an achromatic lens. The achromatic lens can include a first lens and a second lens. The first lens with a negative focal length includes a first optically transparent member having a first surface and a second surface. The second lens is attached to the first lens at the second surface. The second lens having a positive focal length includes a second optically transparent member having a third surface and a fourth surface. A second chromatic aberration of the second lens is reduced by a first chromatic aberration of the first lens. The second surface of the first lens includes a first Fresnel structure.

19 Claims, 10 Drawing Sheets

FIG. 1

(58) Field of Classification Search
CPC ...... G02B 2027/011; G02B 2027/0107; G02B 2027/0105
USPC ................................. 359/630, 741–742, 457
See application file for complete search history.

(56) References Cited

U.S. PATENT DOCUMENTS

| | | | |
|---|---|---|---|
| 10,663,745 B2 | 5/2020 | Ouderkirk et al. | |
| 10,881,287 B1 | 1/2021 | Ouderkirk et al. | |
| 2007/0109489 A1 | 5/2007 | Nomura et al. | |
| 2013/0257689 A1* | 10/2013 | Hotta | G02B 5/02 345/8 |
| 2019/0086675 A1* | 3/2019 | Carollo | G02B 27/288 |
| 2024/0184094 A1* | 6/2024 | Sun | G02B 3/08 |
| 2024/0361580 A1* | 10/2024 | Sun | G02B 13/0035 |

OTHER PUBLICATIONS

Costa, Ana Luiza Fontes de Azevedo, and Vagner Rogerio dos Santos. "From vision to citizenship: types of tables to assess reading in special education." Revista Brasileira de Oftalmologia 77 (2018): 296-302.

Wong, Timothy L., et al. "Folded optics with birefringent reflective polarizers." Digital Optical Technologies 2017. vol. 10335. SPIE, 2017, pp. 1-8.

Hao, B., Wong, T., Le, J., Aastuen, D., Kotz, A., Rosen, D., McGrath, K. and Kent, S., "Building a Predictive Model of Contrast Ratio of Folded Optic Lens Systems for Virtual Reality". 3M Company, 3M Center, St. Paul, MN, 2022, pp. 1-4.

Kress, B.C. and Peroz, C., Feb. 2020, Optical architectures for displays and sensing in augmented, virtual, and mixe reality (AR, VR, MR). In Proc. SPIE (vol. 11310, p. 1131001).

Kress, B.C., 2020. Optical architectures for augmented-, virtual-, and mixed-reality headsets. (No. Title). chapter 5-6 (p. 37-52).

International Search Report and Written Opinion received for PCT Patent Application No. PCT/US2023/074624, mailed on Apr. 23, 2024, 11 pages.

Extended European Search Report received for European Patent Application No. 23935872.4, mailed on May 19, 2026, 9 pages.

Languy et al., "Performance comparison of four kinds of flat nonimaging Fresnel lenses made of polycarbonates and polymethyl methacrylate for concentrated photovoltaics", Optics Letters, vol. 36, No. 14, Jul. 15, 2011, pp. 2743-2745.

* cited by examiner

ACHROMATIC LENS INCLUDING FRESNEL OPTICAL ELEMENT FOR NEAR EYE DISPLAY

TECHNICAL FIELD

The present disclosure relates to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide an achromatic lens. The achromatic lens can include a first lens and a second lens. The first lens having a negative focal length can include a first optically transparent member having a first surface and a second surface. The second lens can be attached to the first lens at the second surface. The second lens having a positive focal length can include a second optically transparent member having a third surface and a fourth surface. A second chromatic aberration of the second lens is reduced by a first chromatic aberration of the first lens, and the second surface of the first lens includes a first Fresnel structure.

In an embodiment, the second surface includes (i) a center region that is smooth and (ii) the first Fresnel structure that surrounds the center region.

In an example, the second surface is an aspheric surface.

In an example, a first ratio of an edge thickness of the first lens over a center thickness of the first lens is between 1 to 1.2, and a second ratio of an edge thickness of the second lens over a center thickness of the second lens is between 1/3 to 1.

In an example, a lens system includes the achromatic lens and a third lens. The third lens with a positive focal length can include a third optically transparent member having a fifth surface and a sixth surface. The sixth surface can have a second Fresnel structure.

The second surface includes (i) a center region that is smooth and (ii) the first Fresnel structure that surrounds the center region of the second surface. The fifth surface includes (i) a center region that is smooth and (ii) the second Fresnel structure that surrounds the center region of the fifth surface. The center region of the second surface corresponds to the center region of the fifth surface.

In an example, a third ratio of an edge thickness of the third lens over a center thickness of the third lens is between 1/3 to 1.

In an embodiment, an optical system can include the lens system, a beam splitter configured to partially transmit and partially reflect light beams from a display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer. The beam splitter is on the fourth surface of the third lens, and the reflective polarizer is on the first surface of the first lens. In an example, the QWP is on a surface of the first lens, the second lens, or the third lens.

In an example, the optical system includes the display device. A pixel array in the display device is configured to generate light beams. A polarization state of the light beams can be a first circular polarization state. The third lens is positioned between the display device and the achromatic lens. The fifth surface of the third lens is configured to face the display device. The second lens is positioned between the first lens and the third lens. The third surface of the second lens is configured to face the third lens.

In an embodiment, an optical system can include the lens system, a beam splitter configured to partially transmit and partially reflect light beams from a display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer. The reflective polarizer is on the fourth surface of the third lens, and the beam splitter is on the first surface of the first lens. In an example, the QWP is on a surface of the first lens, the second lens, or the third lens.

In an example, the optical system includes the display device. A pixel array in the display device is configured to generate light beams. A polarization state of the light beams can be a first linear polarization state. The third lens is positioned between the display device and the achromatic lens. The fifth surface of the third lens is configured to face the display device. The second lens is positioned between the first lens and the third lens. The third surface of the second lens is configured to face the third lens.

Aspects of the disclosure provide an optical system. The optical system can include a lens system including an achromatic lens. The achromatic lens can include a first lens with a negative focal length including a first optically transparent member having a first surface and a second surface, and a second lens attached to the first lens at the second surface. The second lens having a positive focal length can include a second optically transparent member having a third surface and a fourth surface. A second chromatic aberration of the second lens is reduced by a first chromatic aberration of the first lens, and the second surface of the first lens includes a first Fresnel structure. The lens system is configured to direct light beams from a display device to a light receiver.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

A display system can include a lens system that directs light beams from a display device or a real object to a light receiver. In an example, the lens system and the display device can be configured to be positioned within a distance threshold (e.g., 35 mm) of an eye of a user, and the display system can be referred to as a near eye display (NED) system. For example, the display system is a head mounted display (HMD) system worn by a user.

The lens system can include refractive optical element(s) (e.g., a lens) that refract light. For example, light is refracted at surface(s) of a lens. In various embodiments, a refractive power or an optical power (e.g., indicated by a focal length) of a lens can be determined by shape(s) of respective surface(s) (or surface curvature(s)) of the lens. A lens, such as a Fresnel lens, can be obtained by forming a grooved (or an unsmooth, partitioned, or sectioned) surface that maintains the surface curvature of a continuous surface of the lens while using less optical material of the lens. A Fresnel lens can include at least one microstructure (also referred to as a Fresnel structure). In an embodiment, the Fresnel structure includes a plurality of grooves, such as concentric grooves or a set of concentric annular sections. In various examples, the Fresnel lens can be thinner or flatter than the corresponding lens. The Fresnel lens and the corresponding lens can have the same or similar focal length.

Surfaces of lenses of the lens system can have any suitable shapes, such as planar shape(s) parallel to an XY plane, spheric shape(s) with any suitable radius of curvature (e.g., a continuous (or grooved) spheric shape or a discontinuous (or grooved) spheric shape with a Fresnel structure), aspheric shape(s) (e.g., a smooth aspheric shape or a grooved aspheric shape with a Fresnel structure), or other shape(s). As described above, each shape can be a smooth shape or a grooved shape (e.g., a shape including a Fresnel structure).

In some embodiments, the lenses of the lens system are formed by injection molding and are to satisfy certain requirements, for example, having low birefringence. To form the lenses with low birefringence with injection molding, a suitable mold flow is to be used. A suitable mold flow can be achieved without annealing, for example, when a thickness ratio of a lens is within a range, such as close to 1/1. The thickness ratio of the lens can be determined based on the smallest thickness of the lens and the largest thickness of the lens. In an example, the thickness ratio is a ratio of an edge thickness of the lens over a center thickness of the lens. In some examples, such as in FIG. 1, thickness ratios of the lenses in the lens system can be substantially different from 1/1 (e.g., 5/3 for a concave lens (131(*a*)), 1/6 or 1/12 for a convex lens (131(*b*) or (132)), and manufacturing the lenses in the lens system shown in FIG. 1 can be challenging.

Figure 1:
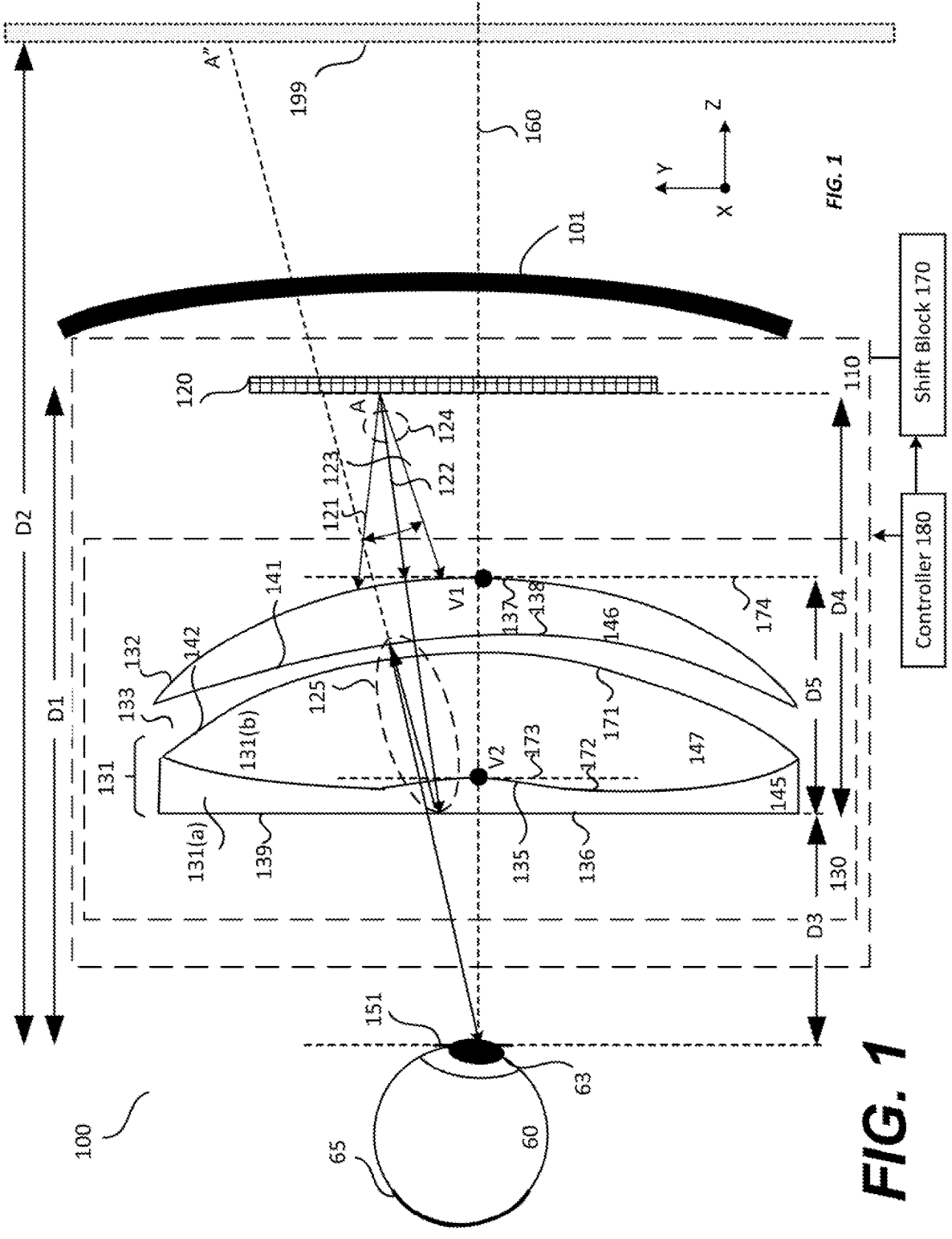
FIG. 1 shows a display system in a side view according to some embodiments of the disclosure.
Figure 6A:
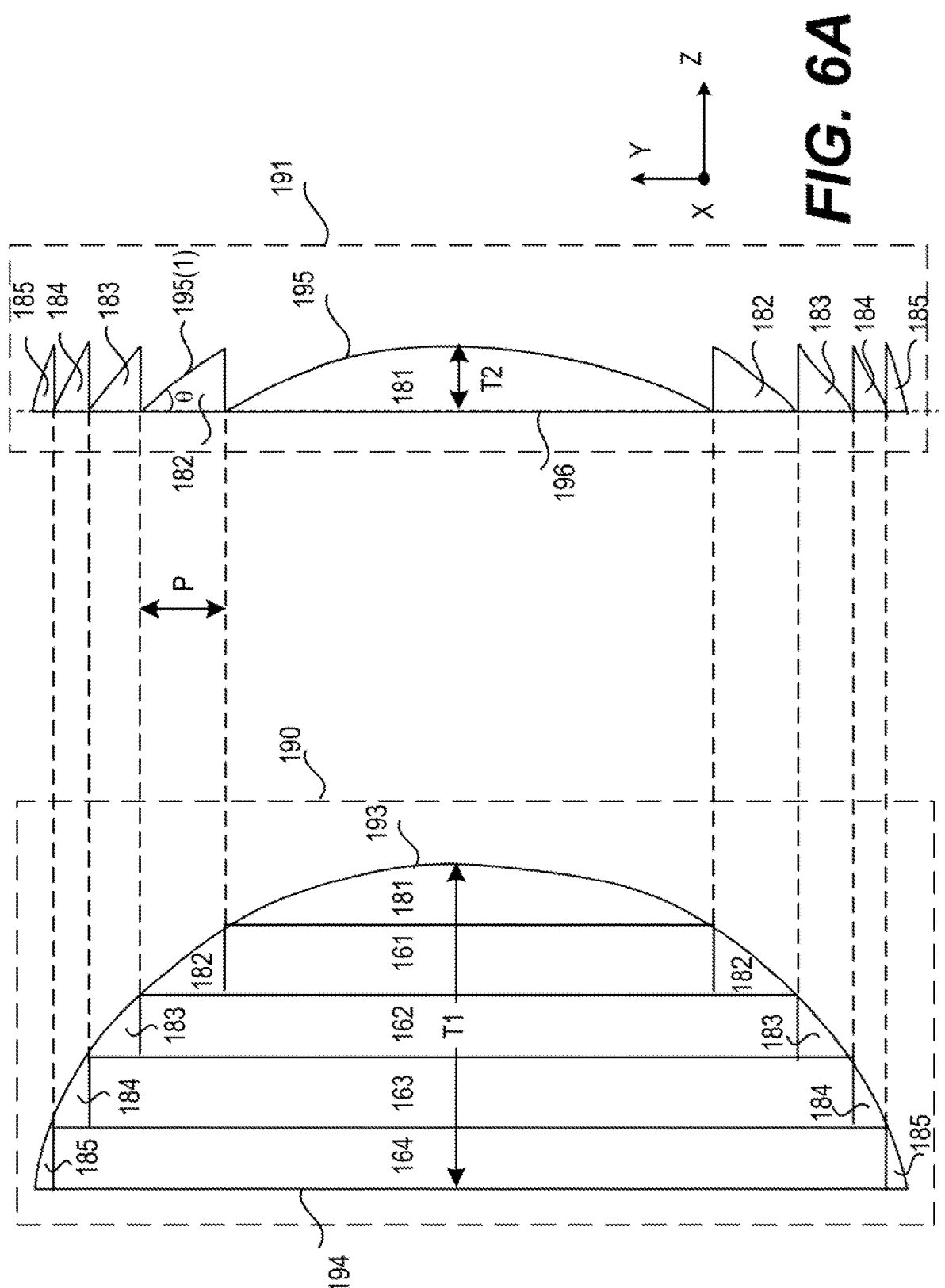
FIG. 6A shows a lens and a corresponding Fresnel lens according to an embodiment of the disclosure.
Figure 6B:
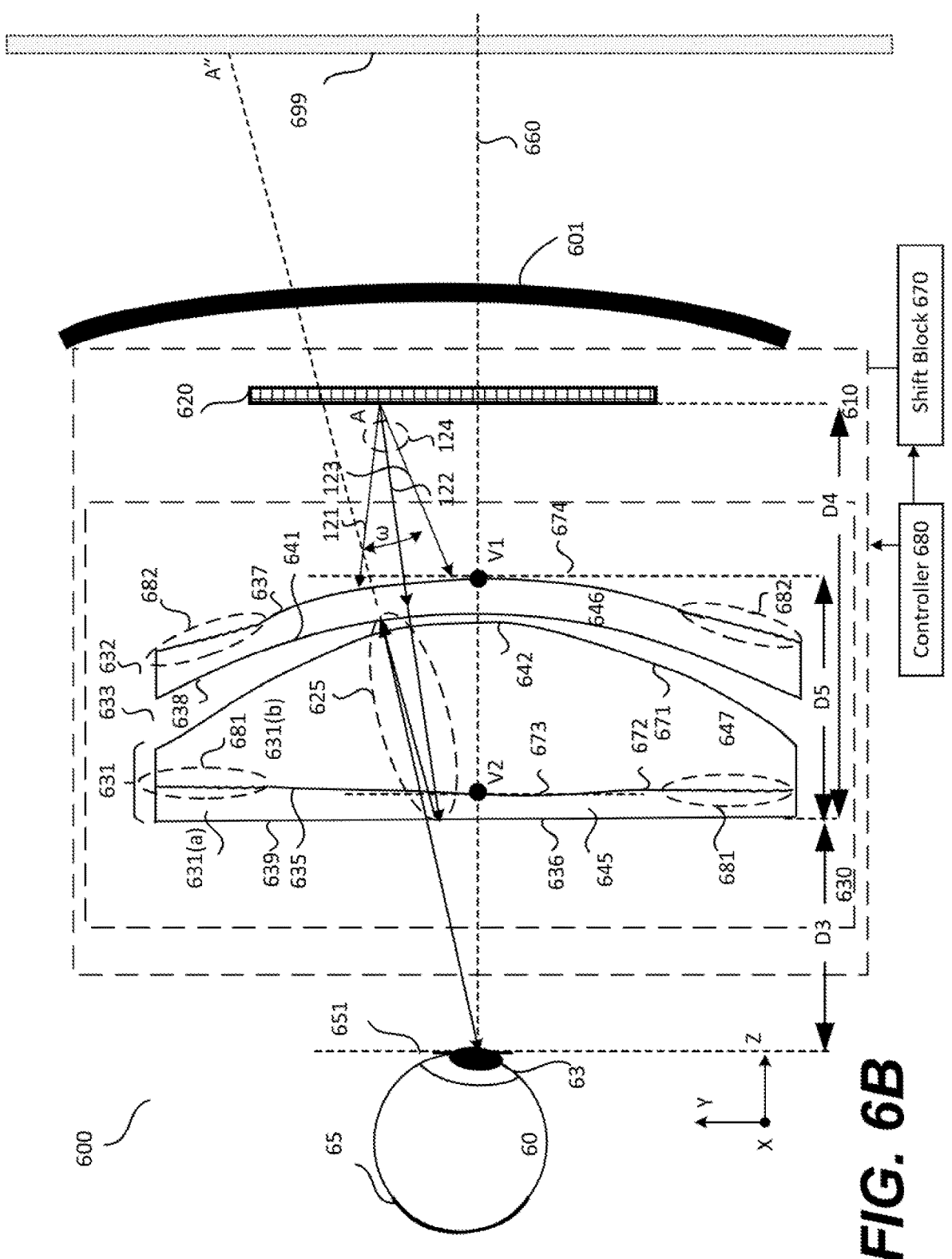
FIG. 6B shows a display system (e.g., a near eye display system) in a side view according to some embodiments of the disclosure.

According to an embodiment of the disclosure, the lenses in the lens system shown in FIG. 1 can be modified to include Fresnel structure(s) such that the modified lenses with the Fresnel structure(s) in the modified lens system (such as shown in FIG. 6B) can have a more uniform thickness profile (e.g., along a Y axis), and thus thickness ratios of the modified lenses with the Fresnel structure(s) can be reduced (e.g., closer to 1) than the corresponding thickness ratios of the lenses in the lens system in FIG. 1. Thus, the modified lens system with the Fresnel structure(s) can have similar or identical parameters as those of the lens system and better mold flows in injection molding than the lens system in FIG. 1.

FIG. 1 shows a display system (e.g., a near eye display system) (100) in a side view according to some embodiments of the disclosure. The display system (100) includes an optical system (110). Optionally, in an example, the display system includes a shift block (170) and a controller (180). The optical system (110) can include a display device (120), a lens system (130), a beam splitter (BS) (141), a reflective polarizer (139), and a quarter-wave plate (QWP) (142). The display device (120) can include a pixel array configured to emit light beams and display images. The lens system (130), the beam splitter (141), the reflective polarizer (139), and the QWP (142) can direct the emitted light beams from the display device (120) to an area (151). In an example, the area (151) is located in an XY plane. In an example, the area (151) is referred to as an exit pupil of the optical system (110). The XY plane includes an X axis and the Y axis that is orthogonal to the X axis. A light receiver or detector, such as an eye (60) of a user or the like, can be located at the area (151). In an example, a lens (63) in the eye (60) forms an image on a retina (65) of the eye (60), and thus the eye (60) perceives an image on the display device (120) as a virtual image, such as a virtual image (199) in FIG. 1. The virtual image (199) appears at a distance D2 from the area (151) and appears larger than the image on the display device (120). The distance D2 is larger, and in some cases much larger, than a distance D1 between the area (151) and the display device (120).

Referring to FIG. 1, an optical cavity can be formed between the beam splitter (141) and the reflective polarizer (139). The optical cavity can include one or more lenses in the lens system (130) and the QWP (142). As described below, an optical path of a light ray in a light beam is folded in the optical cavity between the beam splitter (141) and the reflective polarizer (139). Accordingly, the optical system (110) can be positioned within a distance threshold (e.g., 35 mm) of an eye of a user (e.g., the eye (60)), and the display system (100) can be referred to as an NED system. For example, the display system (100) is an HMD system worn by a user.

The lens system (130) can include a lens, such as an achromatic lens (131). The achromatic lens (131) can include a first lens (131(*a*)) and a second lens (131(*b*)). A first chromatic aberration of the first lens (131(*a*)) can be complementary to (e.g., opposite to) a second chromatic aberration of the second lens (131(*b*)). The second chromatic aberration can be reduced by the first chromatic aberration. A chromatic aberration of the achromatic lens (131) can be less than the first chromatic aberration and the second chromatic aberration. The first lens (131(*a*)) can include an optically transparent member (145) having two opposite surfaces (135)-(136). The second lens (131(*b*)) can include an optically transparent member (147) having two opposite surfaces (171)-(172). In an example, the first lens (131(*a*)) is a diverging lens having a negative focal length, the second lens (131(*b*)) is a converging lens having a positive focal length, and the achromatic lens (131) is a converging lens having a positive focal length. The second lens (131(*b*)) can be attached to the first lens (131(*a*)) at an interface between the surfaces (135) and (172). An optical axis (160) of the lens system (130) can be parallel to the Z axis that is perpendicular to the XY plane. The achromatic lens (131) can have circular symmetry around the optical axis (160).

In an example, the lens system (130) may include one or more additional lenses. For example, the lens system (130) includes a third lens (132). The third lens (132) can include an optically transparent member (146) having two opposite surfaces (137)-(138). The achromatic lens (131) and the third lens (132) can be separated with a gap (133). In an example, the gap (133) is larger than 0. In another example, a portion of the achromatic lens (131) is in contact with a portion of the third lens (132), for example, the smallest distance between the achromatic lens (131) and the third lens (132) is zero. The third lens (132) can have circular symmetry around the optical axis (160).

Figure 4:
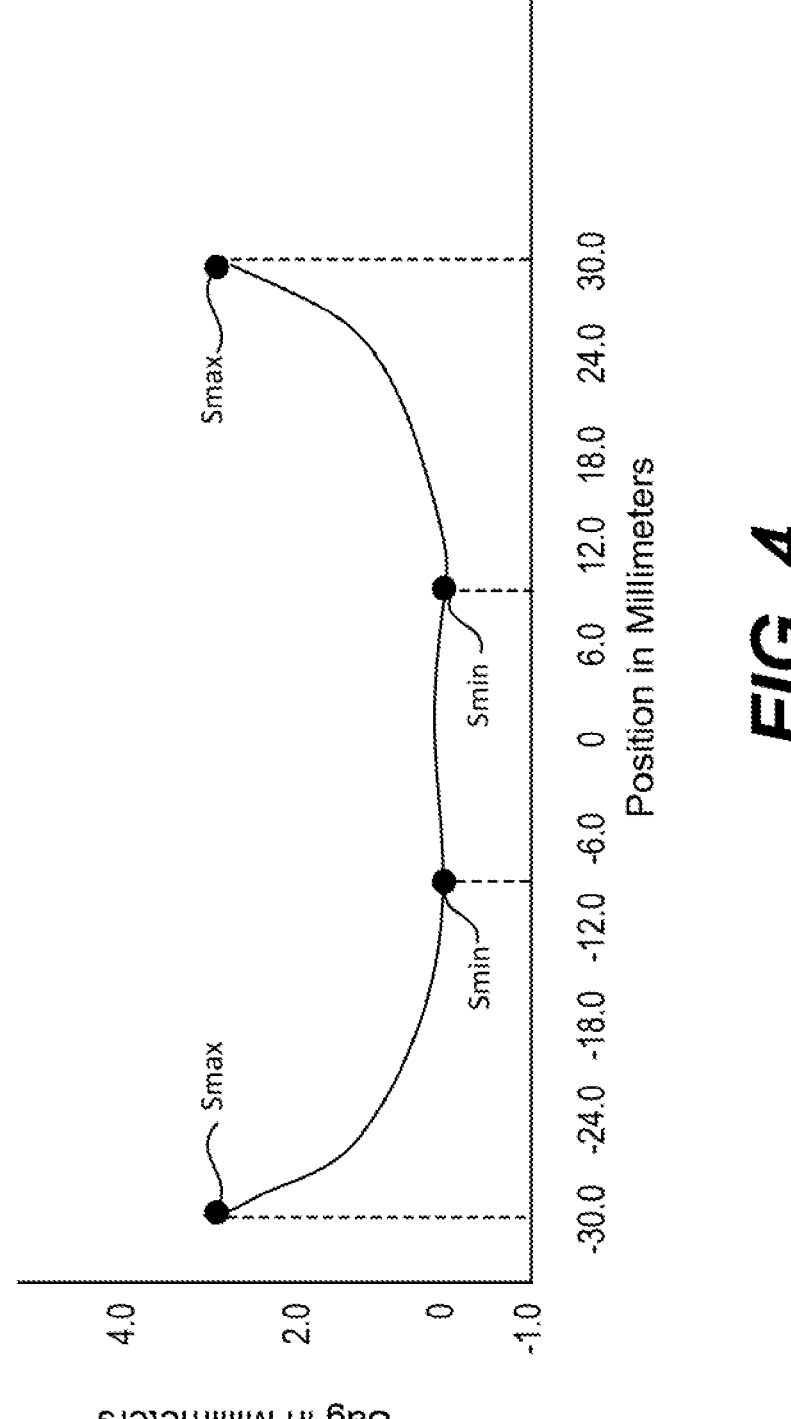
FIG. 4 shows a shape of a surface of a lens according to an embodiment of the disclosure.

The surfaces (135)-(138) and (171)-(172) can have any suitable shapes or surface curvatures, such as planar shape(s) parallel to the XY plane, spheric shape(s) with any suitable radius of curvature, aspheric shape(s), or other shape(s). Shapes of the surfaces (135)-(138) and (171)-(172) can be determined based on design parameters, such as focal lengths, aberration requirements, lens thicknesses, and the like. The first lens (131(*a*)) can be a plano-aspheric negative lens, for example, the surface (136) is planar and the surface (135) is aspheric, such as shown in. FIGS. 1 and 4. In the example shown in FIG. 1, the reflective polarizer (139) is disposed onto the surface (136).

The surface (172) of the second lens (131(*b*)) can be aspheric. A shape of the surface (172) of the second lens (131(*b*)) can match a shape of the surface (135) of the first lens (131(*a*)). The surface (171) of the second lens (131(*b*)) can be spheric or aspheric. In an example, the second lens (131(*b*)) is an aspheric-aspheric positive lens for which the surfaces (171)-(172) are aspheric.

The third lens (132) can be a spheric-spheric lens, a plano-spheric lens, an aspheric-spheric lens, an aspheric-aspheric lens, or the like. The third lens (132) can be referred to as a BS lens, for example, when the BS (141) is disposed onto one of the surfaces (137)-(138). In the example shown in FIG. 1, the BS (141) is disposed onto the surface (138).

The optically transparent members (145)-(147) can include any suitable material(s) including but not limited to glass (e.g., borosilicate glass, dense flint glass), polymer, plastic material(s), such as poly(methyl methacrylate) (PMMA), polyimide, acrylic, styrene, cyclic olefin polymer, cyclic olefin co-polymer, polycarbonate, and/or the like. A glass lens can be fabricated by grinding and polishing, a glass molding method, and/or the like. A polymer or plastic lens can be fabricated by diamond turning, polishing, injection molding, casting, and/or the like.

In an example, material(s) or a composition of the material(s) in the optically transparent member (145) are different from material(s) or a composition of the material(s) in the optically transparent member (147) such that the first chromatic aberration of the first lens (131(*a*)) is complementary to the second chromatic aberration of the second lens (131(*b*)).

In some embodiments, a lens (e.g., the first lens (131(*a*)), the second lens (131(*b*)), or the third lens (132)) that is to have low birefringence is made with injection molding. To form the lens with low birefringence, a suitable mold flow or a good mold flow (e.g., a relatively smooth mold flow) is to be used. A suitable mold flow can be achieved without annealing, for example, when a thickness ratio of a lens is within a range, such as close to 1/1. In an example, the thickness ratio of the lens is defined as (i) a ratio of the smallest thickness of the lens over the largest thickness of the lens or (ii) a ratio of the largest thickness of the lens over the smallest thickness of the lens. In an example, the thickness ratio of the lens is defined as a ratio of an edge thickness of the lens over a center thickness of the lens when the largest thickness of the lens and the smallest thickness of the lens include the edge thickness of the lens and the center thickness of the lens.

The first lens (131(*a*)) can be formed by injection molding using material(s), such as polycarbonate. The first lens (131(*a*)) is to have low birefringence. The good mold flow (e.g., the relatively smooth mold flow) can be achieved without annealing, for example, if a first thickness ratio of the first lens (131(*a*)) (e.g., a ratio of an edge thickness of the first lens (131(*a*)) over a center thickness of the first lens (131(*a*))) is within a first range R1. In an example, the first lens (131(*a*)) is a concave lens. For a concave lens, R1 can be larger than 1, such as between 1 and 1.2. In an example, if the first thickness ratio is 1/1 or is approximately 1/1, a good mold flow can be achieved without annealing. Referring to FIG. 1, the first thickness ratio of the first lens (131(*a*)) is relatively large (e.g., 5/3) and is outside the first range R1, for example, the first thickness ratio of 5/3 may be too large for injection molded lens to have low birefringence.

The second lens (131(*b*)) can be formed by injection molding. The second lens (131(*b*)) is to have low birefringence. The suitable mold flow (e.g., the relatively smooth mold flow) can be achieved, for example, if a second thickness ratio of the second lens (131(*b*)) (e.g., a ratio of an edge thickness of the second lens (131(*b*)) over a center thickness of the second lens (131(*b*))) is within a second range R2. In an example, the second lens (131(*b*)) is a convex lens. For a convex lens, R2 can be less than 1, such as from 1/3 to 1/1. The second range R2 associated with a convex lens (e.g., from 1/3 to 1/1) can be larger than the first range R1 associated with a concave lens (e.g., from 1 to 1.2). Referring to FIG. 1, the second thickness ratio of the second lens (131(*b*)) is relatively small (e.g., 1/12) and is outside the second range R2, for example, the second thickness ratio of 1/12 may be too small for injection molded lens to have low birefringence.

The above description regarding the second lens (131(*b*)) can be applicable to the third lens (132) that is a convex lens shown in FIG. 1. A suitable mold flow (e.g., a relatively smooth mold flow) can be achieved, for example, if a third thickness ratio the third lens (132) (e.g., a ratio of an edge thickness of the third lens (132) over a center thickness of the third lens (132)) is within a third range R3. In an example, R3 is equal to R2. Referring to FIG. 1, the third thickness ratio is relatively small (e.g., from 1/12 to 1/6) and is outside the third rage R3, for example, the third thickness ratio may be too small for injection molded lens to have low birefringence.

The display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an embodiment, a "near eye" display system can include an optical system (e.g., including one or more optical elements) that is placed within the distance threshold of an eye of a user when the NED system (100) (e.g., an HMD, or smart glasses) is utilized. Referring to FIG. 1, the distance D1 between the display device (120) and the area (151) can be less than or equal to the distance threshold. In an example, the distance D1 is between the display device (120) and the eye (60).

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, a pixel A on the display device (120) emits a light beam including a bundle of light rays in suitable directions. A subset (124) of the light rays in the light beam can be directed by the lens system (130) to the area (151). An angular span of the subset (124) of the light beam can be determined based on an acceptance angle ω of the lens system (130). Three light rays (121)-(123) of the subset (124) of the light beam are shown in FIG. 1. The three light rays (121)-(123) can include two boundary rays (121) and (123) and a center ray (122).

In general, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam (e.g., the light beam generated from each pixel) can have any suitable polarization state(s) or DOP. In an example, the light beam is circularly polarized having a DOP of 100%. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam below. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam below.

According to an embodiment of the disclosure, the light beams generated by the display device (120) can be circularly polarized or linearly polarized.

The lens system (130) can be configured to modify the light beams generated by the display device (120), and direct the modified light beams to the area (151). In some embodiments, the lens system (130) can include diffractive elements (gratings and prisms), refractive elements (lenses), guiding elements (e.g., planar waveguides and/or fibers), and polarizing elements (e.g., polarizers, half-wave plates, quarter-wave plates, polarization rotators, Pancharatnam-Berry (PB) Phase lens, and the like). In the example shown in FIG. 1, the lens system (130) includes the achromatic lens (131) and the third lens (132).

The achromatic lens (131) can be disposed between the display device (120) and the area (151). The third lens (132) can be disposed between the achromatic lens (131) and the display device (120). In an example, the achromatic lens (131) can be referred to as an eye lens according to a proximity to the area (151) (e.g., the eye (60)), and the third lens (132) can be referred to as a display lens according to a proximity to the display device (120).

The beam splitter (141) and the reflective polarizer (139) can be disposed between the area (151) and the display device (120). The quarter-wave plate (142) can be disposed between the beam splitter (141) and the reflective polarizer (139), such as over the surface (136), the surface (135), the surface (171), the surface (138), or the surface (137). Anti-reflection (AR) coating(s) can be applied to any suitable surface(s) of the lens system (130) to reduce unwanted reflections of the light beams.

The beam splitter (141) can be configured to partially transmit and partially reflect light beams incident onto the beam splitter (141). The beam splitter (141) can have an average optical transmittance T and an average optical reflectance R. In an example, a sum of T and R is 1 (i.e., 100%) over a wavelength range (e.g., 380 to 780 nanometers (nm)). The average optical transmittance T and the average optical reflectance R of the beam splitter (141) can be referred to as T/R. T or R can be in a range (e.g., from 40% to 60%). In an example, the beam splitter (141) has T/R of 40/60, 50/50, or 60/40. For example, if T and R are 50%, the beam splitter (141) transmits 50% and reflects 50% of the light beams incident onto the beam splitter (141). In general, a beam splitter can include one or more thin films coated or deposited on a surface of a lens in the lens system (130). The beam splitter (141) can include one or more thin films coated or deposited, for example, on the surface (138) of the third lens (132). The beam splitter (141) partially transmits and partially reflects light beams from the display device (120).

A polarization state of a light beam can be altered as the light beam passes through certain optical elements. In an embodiment, a polarization state of a light beam can be altered by a waveplate or a retarder as the light beam travels through the waveplate. The quarter-wave plate (142) can alter a polarization state of a light beam traveling through the quarter-wave plate (142) by 90° or π/2. In an example, the quarter-wave plate (142) converts linearly polarized light into circularly polarized light or circularly polarized light into linearly polarized light. The quarter-wave plate (142) can be formed on a surface in the lens system (130).

The reflective polarizer (139) can be configured to pass through a light beam having a first linear polarization state and reflect the light beam having a second linear polarization state. The second linear polarization state is orthogonal to the first linear polarization state. The reflective polarizer (139) can include one or more layers of optical films. In an example, the reflective polarizer (139) is formed on a surface in the lens system (130.

Referring to FIG. 1, the beam splitter (141), the quarter-wave plate (142), and the reflective polarizer (139) can conform to shapes of respective surfaces. For example, the beam splitter (141) and the quarter-wave plate (142) are curved to conform to shapes of the surfaces (138) and (171), respectively. The reflective polarizer (139) is planar to conform to a shape of the surface (136). In another example, the quarter-wave plate (142) is formed over the surface (136).

Referring to FIG. 1, the beam splitter (141) is disposed on the surface (138) of the third lens (132), and the reflective polarizer (139) is disposed on the surface (136) of the first lens (131(a)). The quarter-wave plate (142) is formed on the surface (171) of the second lens (131(b)). The optical cavity can be formed between the beam splitter (141) and the reflective polarizer (139). The optical cavity can include the achromatic lens (131), the gap (133), and the QWP (142).

The light beams emitted from the display device (120) can pass the third lens (132) and can be partially transmitted by the beam splitter (141). Subsequently, the light beams pass the optical cavity a plurality of times. In an example, the light beams pass the optical cavity for a first time and are reflected by the reflective polarizer (139). The light beams then pass the optical cavity for a second time and are partially reflected by the beam splitter (141). After passing the optical cavity for a third time, the light beams are transmitted by the reflective polarizer (139) and reach the area (151).

The optical system (110) includes a catadioptric optical system. For example, the catadioptric optical system (110) includes (i) refractive optical components (e.g., the lens system (130)) and (ii) reflective optical components (e.g., the beam splitter (141) when acting as a reflector to reflect light and the reflective polarizer (139) when acting as a reflector to reflect light).

The catadioptric optical system (110) may include a polarized catadioptric optical system. For example, each time the light beams pass through the QWP (142), a polarization state of the light beams is manipulated by the QWP (142). Accordingly, the light beams are in one polarization state and is reflected by the reflective polarizer (139) after the first pass, and the light beams are in another polarization state and is transmitted by the reflective polarizer (139) after passing the optical cavity for a third time.

The optical system (110) may be referred to as a folded optical system. As light beams are reflected between the beam splitter (141) and the reflective polarizer (139), and travel multiple times (e.g., three times) in the optical cavity, an optical path between the display device (120) and the area (151) includes a folded path (125) between the beam splitter (141) and the reflective polarizer (139). The folding of the optical path can allow the distance D1 to be decreased, and the display system (100) including the optical system (110) can be used as a NED system. In an example, the lens system (130) is designed to have a relatively small thickness D5, and may be referred to as a pancake lens system.

Referring to FIG. 1, the ray (122) emitted from the pixel A of the display device (120) passes the third lens (132) and is partially transmitted by the beam splitter (141). Subsequently, the ray (122) passes the optical cavity for a first time where the ray (122) sequentially passes through the gap (133), the QWP (142), the optically transparent member (147), and the optically transparent member (145).

After the ray (122) passes the optical cavity for the first time, the ray (122) is reflected back into the optical cavity by the reflective polarizer (139). Subsequently, the ray (122) passes the optical cavity for a second time where the ray (122) sequentially passes through the optically transparent member (145), the optically transparent member (147), the QWP (142), and the gap (133).

After the ray (122) passes the optical cavity for the second time, the ray (122) is partially reflected back into the optical cavity by the beam splitter (141). Subsequently, the ray (122) passes the optical cavity for a third time where the ray (122) sequentially passes through the gap (133), the QWP (142), the optically transparent member (147), and the optically transparent member (145). Then, the ray (122) is transmitted by the reflective polarizer (139) and travels to the area (151). In an example, the ray (122) is focused by the lens (63) of the eye (60) onto the retina (65), and the eye (60) perceives the ray (122) as if the ray (122) is from a virtual point A" on the virtual image (199).

The light beams emitted from the pixels (e.g., including the pixel A) in the display device (120) can be circularly polarized, for example, in a first circular polarization state. The beam splitter (141) partially transmits the ray (122) in the first circular polarization state. Then the ray (122) passes the optical cavity for the first time as described above. During the first pass, the first circular polarization state of the ray (122) is converted to the second linear polarization state by the QWP (142). The second linear polarization state is along a block direction of the reflective polarizer (139). The block direction of the reflective polarizer (139) refers to a direction where if an electric field vector of a light beam is along the block direction, the light beam is blocked by the reflective polarizer (139) and is not transmitted through the reflective polarizer (139). The reflective polarizer (139) reflects the ray (122) having the second linear polarization state, for example, with a relatively high average reflectance that is above or equal to a value (e.g., 90%) over a wavelength range (e.g., 380 to 780 nm). Then the ray (122) passes the optical cavity for the second time as described above, and the ray (122) is partially reflected by the beam splitter (141). Subsequently, the ray (122) passes the optical cavity for the third time as described above. During both the second pass and the third pass, the QWP (142) alters the polarization state of the ray (122). Accordingly, the second linear polarization state of the ray (122) is converted to the first linear polarization state that is parallel to a transmission direction of the reflective polarizer (139). Thus, the reflective polarizer (139) transmits the ray (122) having the first linear polarization state such that the ray (122) is directed to the area (151) with a relatively high transmittance that is above or equal to a value (e.g., 90%) over a wavelength range (e.g., 380 to 780 nm).

Referring to FIG. 1, the optical path includes the folded path (125) between the reflective polarizer (139) and the beam splitter (141) due to the polarization change.

In an embodiment, positions of the beam splitter (141) and the reflective polarizer (139) are interchangeable. For example, the reflective polarizer (139) is disposed on the surface (138) of the third lens (132), and the beam splitter (141) is disposed on the surface (136) of the first lens (131(a)).

To achieve high quality imaging, the reflective polarizer (139) is to have high-quality, such as a high reflectance (e.g., the high average reflectance) in the block direction, a high transmittance (e.g., the high average transmittance) in the pass direction, relatively small surface roughness, and the like. Further, the AR coating can be applied to any suitable surface(s) in the optical system (110) to reduce or eliminate ghosting due to the multi-reflections at various interfaces.

Polarized catadioptric optical systems are emerging solutions for virtual reality HMDs. A good VR optical system can include a large pupil volume (also referred to as an eye box) to accommodate multiple interpupillary distances and to allow for eye rotation as the user scans across the FOV. In an example, the eye box indicates a volume where an eye receives an acceptable view of an image. A size and a location of the eye box can be related to a number of constraints, such as a FOV and image quality. In an example, the eye box indicates a range of eye positions, at an eye relief distance, from which an image produced by the optical system (110) is visible. The eye box can include eye movements, such as eye rotation and/or lateral movement.

An optical power can indicate a degree to which an optical system or an optical component (e.g., a lens or a curved mirror) converges or diverges light. In an example, the optical power of the optical component or system is equal to a reciprocal of a focal length f of the optical component or system. A higher optical power indicates (i) a stronger focusing power for a converging optical component/system or (ii) a stronger diverging power for a diverging optical component/system.

In a polarized catadioptric optical system, such as the optical system (110), a folded optical path (e.g., the folded path (125)) can be used to achieve a relatively high optical power with a compact form factor. In the example shown in FIG. 1, the beam splitter (141) is a curved mirror that partially reflects and partially transmits light, and the reflective polarizer (139) can reflect as a planar mirror or transmit light depending on a polarization state of the light. Design freedoms available in a folded optical system (e.g., the optical system (110)) can provide benefits to HMD systems. The benefits can include a high resolution achieved with reflective imaging, a wide FOV (e.g., by using low aberration lenses), a compact size, a decreased weight, an ability to adjust focus, and forming a larger eye box. The FOV can indicate an extent of an observable world that is seen or detected by a light receiver (also referred to as an optical sensor). In an example, the FOV is indicated by a solid angle within which the light detector can detect or receive light. The optical system (110) shown in FIG. 1 can be manufactured by controlling a curved form and surface finish of the achromatic lens (131). A pancake optical system (e.g., the optical system (110)) can deliver a comfortable and immersive user experience.

The optical system (110) can have a large pupil volume to accommodate multiple interpupillary distances and to allow for eye rotation as a user scans across the FOV. An interpupillary distance (IPD) is a distance between centers of pupils of eyes of a user. IPDs can vary with respect to age, gender, or the like. The optical system (110) can be designed by taking IPD variance into account such that the optical system (110) can accommodate various users with different IPDs. In an example, IPDs vary from approximately 50 to 80 mm.

In an example, to allow users to enjoy VR without prescription glasses or with a dynamic focus, the optical system (110) can adjust a diopter of a lenses in the lens system (130) to match the prescription. In an example, the diopter indicates a virtual object distance. Increasing the diopter can make an object appear closer. The focus accommodation can be achieved by changing an optical power of the optical system. The optical power of a folded mirror cavity (e.g., the optical cavity between the beam splitter (141) and the reflective polarizer (139)) can be changed by varying a cavity length (or a gap) relative to a reference cavity length corresponding to a reference optical power.

The controller (180) is coupled to the optical system (110) and the shift block (170) to control the operations of the optical system (110) and the shift block (170).

The shift block (170) can include a mechanical shifter. In some examples, the mechanical shifter can shift a position of the display device (120). In some examples, the mechanical shifter can shift position(s) of at least one optical element (e.g., the achromatic lens (131) or the third lens (132) in the lens system (130)). A relatively small adjustment to the gap (133) can be amplified, for example, 3 times, due to the folded path (125) in the optical cavity.

The display system (100) can include other suitable mechanical, electrical and optical components. For example, the display system (100) includes a frame (101) that can protect other components of the display system (100). In another example, the display system (100) can include a strap (not shown) to fit the display system (100) on a user's head. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Considering human factors, such as human vision (e.g., a FOV of a human eye, eye rotation), head rotation, and the like may help design optical parameters of the optical system (110). An optical design with a high resolution over a range of eye rotations can make a viewing experience of a user more natural.

Figure 2:
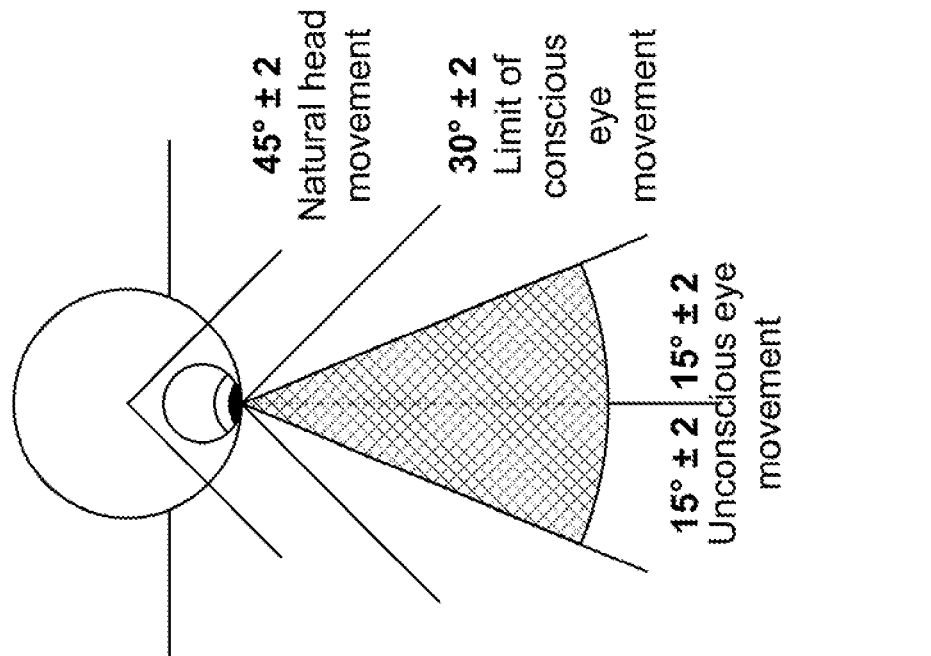
FIG. 2 shows examples of eye rotations and head rotations.

Unconstrained or unconscious eye rotation can be less than 20°. FIG. 2 shows examples of eye rotations and head rotations. A horizontal unconscious eye rotation can be less than a value (e.g., 20°) from a center to a left side or a right side, such as 15°±2°. A horizontal conscious eye rotation can be larger than that of the horizontal unconscious eye rotation. In an example, the horizontal conscious eye rotation is up to a value, such as 30°±2°. In another example, an eye can rotate approximately 28°±8° up, and 47°±8° down. FIG. 2 also shows an example of a natural head movement. In an example, the natural head movement is 45°±2° horizontally.

In an example, humans have a slightly over 210° forward-facing horizontal arc of visual fields without eye movements. A horizontal FOV of both human eyes can be 210°. A vertical range of the visual field (or the vertical FOV) in humans is around 150°.

Figure 3:
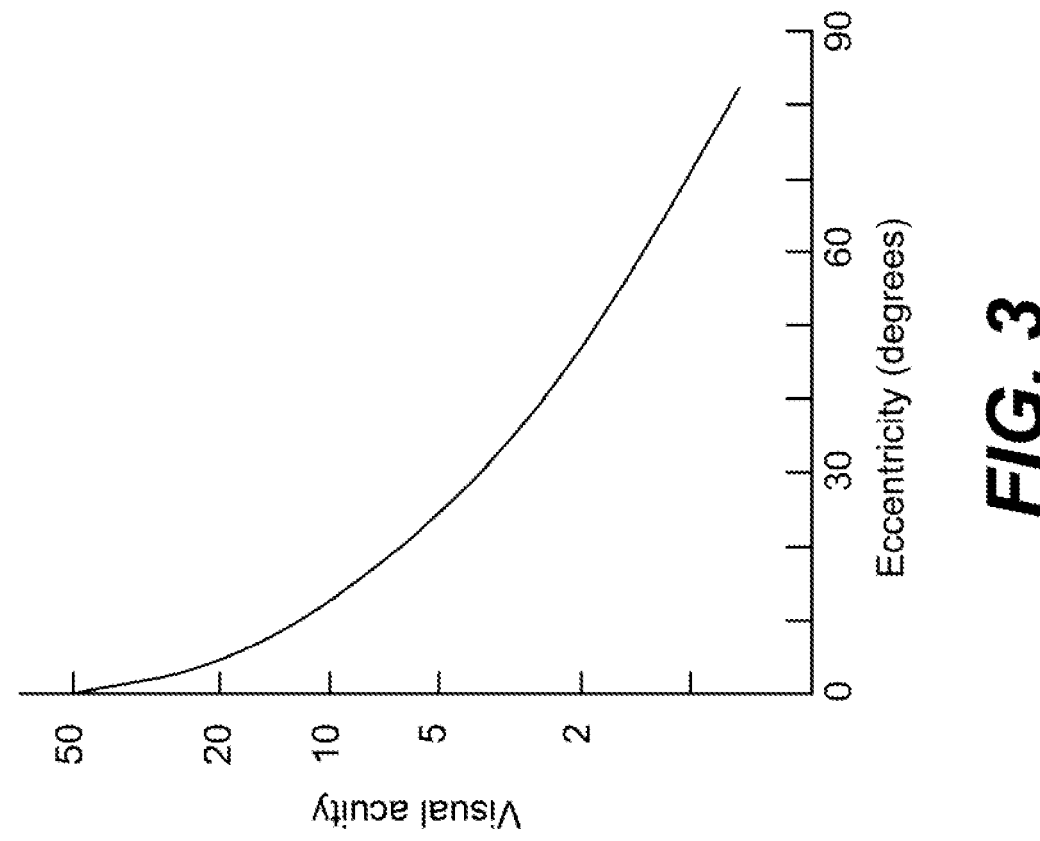
FIG. 3 shows a relationship between visual acuity and eccentricity.

A human eye is not a perfect lens over a large FOV. Visual acuity can indicate clarity or sharpness of vision. An eccentricity can refer to an angular distance from a center of a visual field or from the foveola of a retina. FIG. 3 shows a relationship between visual acuity (including peripheral visual acuity) and eccentricity. The visual acuity can decrease with the eccentricity. Accordingly, a resolution of an optical system in a peripheral field can be lower than a resolution of the optical system in a center field because eyes lack visual acuity in the peripheral field without eye rotation to gaze directly to the peripheral field. Considering visual acuity can avoid overdesign of an optical system.

In some examples, parameters of the display system (100) include a field of view (FOV), an eye relief, a lens track length, a display size, a size of the area (151), and/or the like. The eye relief (e.g., a distance D3) can refer to a distance between a light receiver (e.g., the area (151)) and the lens system (130). In an example, the distance D3 between the area (151) and the last optical component (e.g., the achromatic lens (131)) in the optical system (110) before the area (151) is 14 mm. The lens track length (e.g., a distance D4) can refer to a distance between the display device (120) and the lens system (130). The distance D4 between the display device (120) and the achromatic lens (131) is 19.5 mm. In the example shown in FIG. 1, the distance D4 is measured from the display device (120) to the surface (136). In an example, D1 is equal to a sum of D3 and D4. In another example, the distance D4 is measured from the display device (120) to the surface (137). The display size is indicated by a display image circle that is imaged by the optical system (110) onto the area (151), and the display image circle has a radius of 18.9 mm. The size (e.g., pupil size) of the area (151) is 5 mm. The FOV of the optical system (110) is 110°. The optical system (110) can form the virtual image (199) from an image on the display device (120) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like. The parameter values provided in the description are merely exemplary and are not intended to limit the scope of the disclosure.

FIG. 4 show a shape of the surface (135) according to an embodiment of the disclosure. The shape of the surface (135) can be represented by a sagitta. A sagitta or a sag can indicate material removed to yield an optical surface (or an optical curve). FIG. 4 shows a relationship between a sag (in mm) of the surface (135) and a position along an axis (e.g., Y axis) that is perpendicular to the optical axis (160). In an example, the sag indicates a distance along the optical axis (160) between a line (173) and a respective point on the curve (135) formed by an interception of the surface (135) of the first lens (131(a)) and the YZ plane. The line (173) passes through a vertex V2 of the surface (135) and is tangential to the surface (135). The position of V2 is at the center of the first lens (131(a)) (e.g., 0 mm), and the sag at V2 is 0 mm. A sagitta difference (e.g., a maximum sagitta difference) between (i) a minimum sagitta $S_{min}$ (e.g., at 10 mm or −10 mm) of the surface (135) and (ii) a maximum sagitta $S_{max}$ (e.g., at 30 mm or −30 mm) of the surface (135) is approximately 3 mm. A shape of the surface (172) can match the shape of the surface (135). In an example, the shape of the surface (172) is indicated by the shape of the surface (135).

Figure 5:
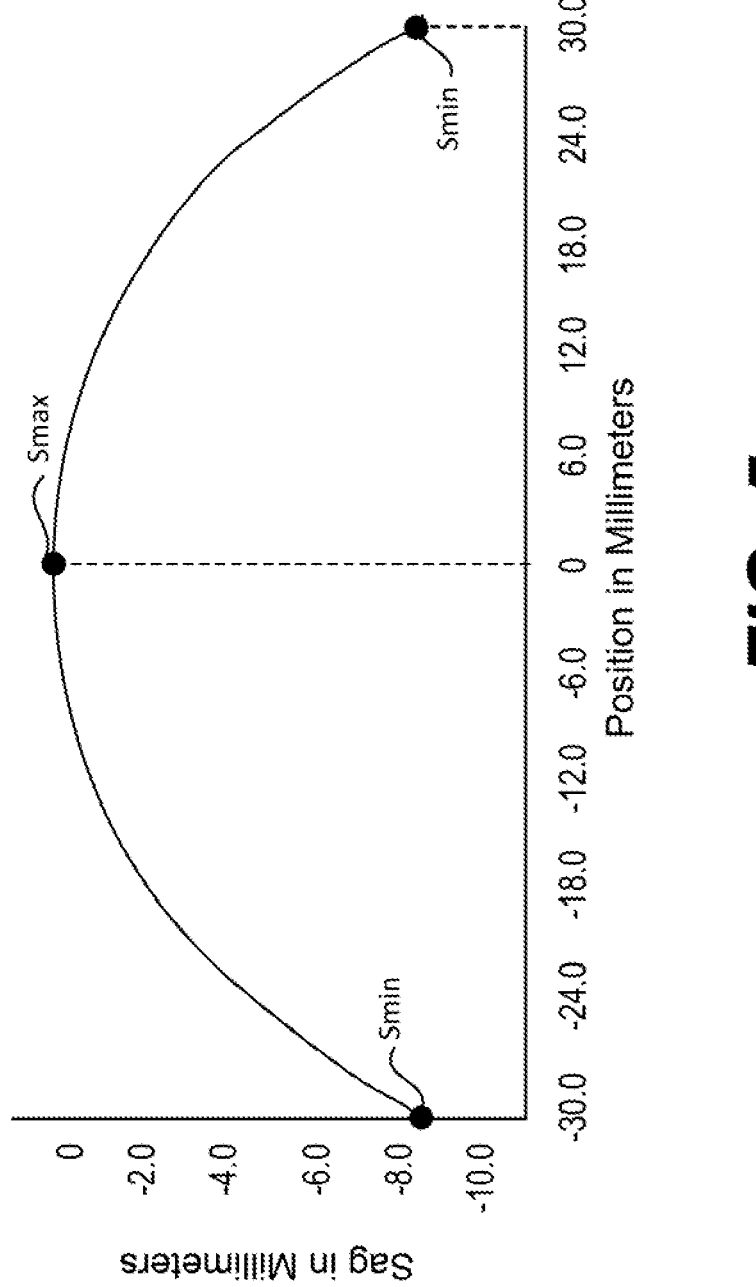
FIG. 5 shows a relationship between a sag (in mm) of a surface and a position along an axis that is perpendicular to an optical axis according to an embodiment of the disclosure.

FIG. 5 shows an exemplary relationship between a sag (in mm) of the surface (137) and the position along the axis (e.g., the Y axis) that is perpendicular to the optical axis (160). The sag can be a distance along the optical axis (160) between a line (174) and a respective point on the curve (137) formed by an interception of the surface (137) and the YZ plane. The line (174) passes through a vertex V1 of the surface (137) and is tangential to the surface (137). In FIG. 5, a sagitta difference (e.g., a maximum sagitta difference) between (i) a minimum sagitta $S_{min}$ (e.g., at about 30 mm or −30 mm) of the surface (137) and (ii) a maximum sagitta $S_{max}$ (e.g., at 0 mm) of the surface (137) is approximately 8.5 mm. In an example, a shape of the surface (171) of the second lens (131(b)) is identical or similar to the shape of the surface (137) and can be indicated by FIG. 5.

In some examples, one of the first thickness ratio of the first lens (131(a)), the second thickness ratio of the second lens (131(b)), and the third thickness ratio of the third lens (132) is outside the respective range, and thus manufacturing the lens system (130) can be challenging. Referring to FIG. 1, the first thickness ratio (e.g., 5/3) of the first lens (131(a)) is outside the first range R1, the second thickness ratio (e.g., 1/12) of the second lens (131(b)) is outside the second range R2, and the third thickness ratio (e.g., 1/12 to 1/6) of the third lens (132) is outside the third range R3. Thus, forming the first lens (131(a)), the second lens (131(b)), and the third lens (132) with low birefringence, for example, using injection molding, can be challenging. According to an embodiment of the disclosure, the lens system (130) can be modified by including one or more microstructures, such as Fresnel structures, for example, to allow a compact lens shape that is more compatible with certain fabrication methods (e.g., injection molding) while maintaining focusing power. In an embodiment, the achromatic lens (131) can be modified to include a Fresnel optical element or a Fresnel lens.

FIG. 6A shows a lens (190) and a corresponding Fresnel lens (191) according to an embodiment of the disclosure. The lens (190) includes an optical transparent member between surfaces (193)-(194). The lens (190) has a largest thickness T1, for example, at a center of the lens (190). The Fresnel lens (191) can include an optical transparent member between surfaces (195)-(196). A surface curvature of the surface (193) of the lens (190) can be preserved by the grooved surface (195) of the Fresnel lens (191), and thus the Fresnel lens (191) can have a same or substantially identical focal length as that of the lens (190). For example, the smooth surface (193) of the lens (190) are divided into smaller concentric portions (181)-(185), and the portions (181)-(185) are shifted along an optical axis (e.g., parallel to the Z axis in FIG. 6A) of the lens (190) to form the Fresnel lens (191). In an example, shapes of the portions (181)-(185) in the lens (190) are identical or substantially identical to respective shapes of the portions (181)-(185) in the Fresnel lens (191).

Portions (181)-(185) of the Fresnel lens (191) correspond to the portions (181)-(185) of the lens (190), for example, the portions (181)-(185) of the Fresnel lens (191) have identical shapes and materials as those of the portions (181)-(185) of the lens (190). To illustrate the relationship between the lens (190) and the Fresnel lens (191), portions (161)-(164) of the lens (190) can be considered as removed, and the remaining portions (181)-(185) of the lens (190) can be considered as realigned to the surface (196) (e.g., parallel to the XY plane). The lens (190) can be considered as collapsed into the Fresnel lens (191) while preserving the surface curvature of the surface (193), and thus preserving the optical power of the lens (190). The continuous surface (193) can become a grooved surface (195) with discontinuities between the adjacent portions (181)-(185). A largest thickness T2, for example, at a center of the Fresnel lens (191) is less than the thickness T1 at the center of the lens (190). Various methods can be applied to manufacture the Fresnel lens (191).

In some embodiments, a surface of the portion (e.g., the center portion) (181) of the Fresnel lens (191) is continuous (or smooth) and does not include a Fresnel structure. A surface of a peripheral portion (e.g., including the portions (182)-(185)) of the Fresnel lens (191) that surrounds the center portion (181) can be discontinuous or grooved and can include the Fresnel structure. A size of the center portion (181) without a Fresnel structure and a size of the peripheral portion including the Fresnel structure can be chosen, for example, based on design requirements.

Referring to FIG. 6A, the Fresnel structure can include a plurality of grooves (e.g., prisms) such as the portions (182)-(185). In an example, the portions (182)-(185) are concentric grooves. A pitch (e.g., a prism pitch) P can represent a spacing between adjacent grooves (e.g., prisms). The pitch P can be non-uniform (such as shown in FIG. 6A) or uniform. A slope angle θ can represent an angle between the surface (196) and a respective portion (e.g., (195(1))) of the surface (195). Parameters of the Fresnel lens (191) including but not limited to a size of the pitch P, a distribution of the pitch P across the Fresnel structure, and slope angles θ can be determined, for example, based on design requirements.

In some examples, size(s) of respective center portion(s) of a Fresnel lens, such as the size of the center portion (181), are less than a threshold, for example, the size of the center portion (181) is comparable or identical to the pitch of another groove (e.g., (182)), the plurality of grooves can include the center portion(s) (e.g., (181)), and the Fresnel structure can include the entire Fresnel lens.

Achromatic lenses can reduce chromatic aberration in an optical lens system. Head mounted and/or near eye display optical systems can use a compact optical lens module to provide a device with a compact form, such as a pancake optical system. A Fresnel structure can be used to reduce a lens thickness or a lens size, for example, by flattening the lens in a relatively uniform way. Including Fresnel lens-like construction can facilitate fabrication of a compact achromatic lens.

FIG. 6B shows a display system (e.g., a near eye display system) (600) in a side view according to some embodiments of the disclosure. The display system (600) includes an optical system (610), a shift block (670) and a controller (680). The optical system (610) can include a display device (620), a lens system (630), a BS (641), a reflective polarizer (639), and a QWP (642). The lens system (630) can include an achromatic lens (631). The achromatic lens (631) can include a first lens (631(a)) and a second lens (631(b)). The first lens (631(a)) can include an optically transparent member (645) having two opposite surfaces (635)-(636). The second lens (631(b)) can include an optically transparent member (647) having two opposite surfaces (671)-(672). The second lens (631(b)) can be attached to the first lens (631(a)) at an interface between the surfaces (635) and (672). In an example, the second lens (631(b)) is attached to the first lens (631(a)) directly. In another example, the second lens (631(b)) is attached to the first lens (631(a)) via a transparent layer. A thickness of the layer is much less than (e.g., 1/10 of) a thickness of the first lens (631(a)) and a thickness of the second lens (631(b)). An optical axis (660) of the lens system (630) can be parallel to a Z axis that is perpendicular to an XY plane. In an example, the lens system (630) includes a third lens (632). The third lens (632) can include an optically transparent member (646) having two opposite surfaces (637)-(638). The achromatic lens (631) and the third lens (632) can be separated with a gap (633).

The lens system (630), the optical system (610), and the display system (600) in FIG. 6B can be related to the lens system (130), the optical system (110), and the display system (100) in FIG. 1, respectively. According to an embodiment in the disclosure, the lens system (630) can be a variation of the lens system (130). Thus, the optical system (110) and the display system (100) can be modified as the optical system (610) and the display system (600), respectively. At least one surface of the surfaces (135)-(138) and (171)-(172) can be modified such that at least one surface of the surfaces (635)-(638) and (671)-(672) includes a Fresnel structure, such as a plurality of grooves. Accordingly, the lens system (630) includes at least one Fresnel lens.

Figure 6C:
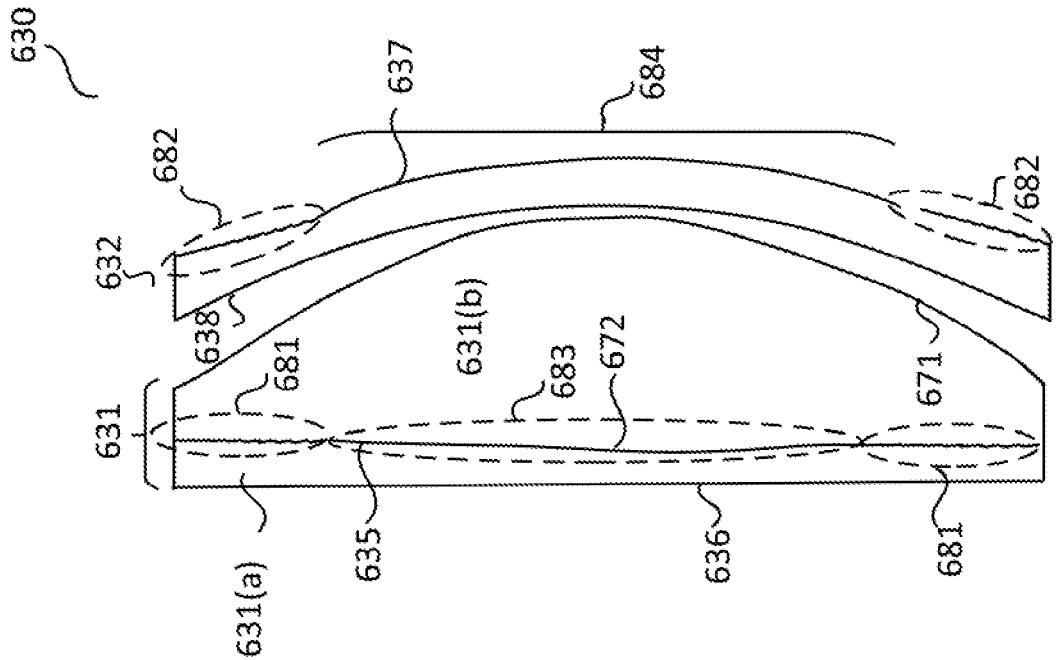
FIG. 6C shows a lens system according to an embodiment of the disclosure.

FIG. 6C shows the lens system (630) according to an embodiment of the disclosure. Referring to FIGS. 6B-6C, an interface between the surfaces (635) and (672) can have a surface profile based on a Fresnel structure (681). The surface (635) can include the Fresnel structure (681). The surface (672) can include a Fresnel structure that has an identical profile as that of the Fresnel structure (681). The surface (637) can include a Fresnel structure (682). Accordingly, the first lens (631(a)), the second lens (631(b)), and the third lens (632) are Fresnel lenses. A surface curvature of the surface (135) of the first lens (131(a)) in FIG. 1 can be preserved by the grooved surface (635) of the first lens (631(a)), and the first lens (631(a)) can have a same or similar focal length as that of the first lens (131(a)). Referring to FIG. 6C, a center portion (or a center region) (683) of the first lens (631(a)) is smooth and does not include a Fresnel structure, and the Fresnel structure (681) can surround the center region (683).

A lens can include a center region and a peripheral region that surrounds the center region. The center region of the lens can be used for high resolution and low ghost viewing/imaging, and viewing/imaging through the peripheral region of the lens can have a low resolution. A Fresnel structure (also referred to as a Fresnel lens structure or a Fresnel feature) can cause diffraction artifacts, and thus viewing and/or imaging via a region including a Fresnel structure may deteriorate the resolution. In some examples, it is less desirable to incorporate a Fresnel feature into a lens area (e.g., a center region of the lens) that is used for a high resolution and low ghost optical (viewing/imaging) path. In various embodiments, a good optical viewing area can be within an FOV threshold, such as 70° on axis view. Thus, a Fresnel structure or a Fresnel feature can be included outside the FOV threshold (e.g., an FOV of 70°), for example, to ensure that the Fresnel structure only affects a low resolution far-field peripheral vision while enhancing lens manufacturability as described above.

Referring to FIG. 6C, the center portion (or the center region) (683) of the first lens (631(*a*)) within the FOV threshold (e.g., an FOV of 70°) does not include a Fresnel structure. The Fresnel structure (681) that surrounds the center region (683) can be disposed outside the FOV threshold. A size (e.g., a diameter) of the center region (683) can depend on the FOV threshold (e.g., 70°). In an example, the size of the center region (683) depends on the FOV threshold (e.g., 70°) and the distance D3 (or the eye relief). The size of the center region (683) can increase with the FOV threshold (e.g., 70°) and the distance D3 (or the eye relief).

Figure 7:
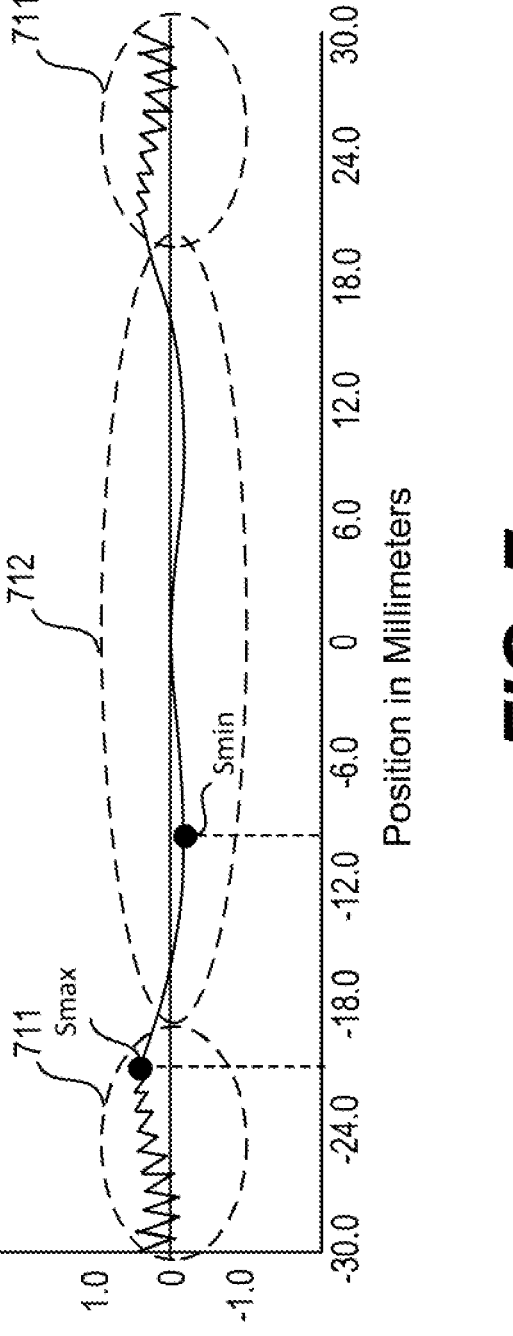
FIG. 7 shows a relationship between a sag (in mm) of a surface and a position along an axis that is perpendicular to an optical axis according to an embodiment of the disclosure.

FIG. 7 shows a relationship between a sag (in mm) of the surface (635) and a position along an axis (e.g., Y axis) that is perpendicular to the optical axis (660). In an example, the sag indicates a distance along the optical axis (660) between a line (673) and a respective point on the curve (635) formed by an intersection of the surface (635) of the first lens (631(*a*)) and the YZ plane. The line (673) passes through a vertex V2 of the surface (635) and is tangential to the surface (635). Referring to FIG. 7, the position of V2 is at the center of the first lens (631(*a*)) (e.g., 0 mm), and the sag at V2 is 0 mm. A sagitta difference (e.g., a maximum sagitta difference) between (i) a minimum sagitta $S_{min}$ (e.g., at about 10 mm or −10 mm) of the surface (635) and (ii) a maximum sagitta $S_{max}$ (e.g., at 21 mm or −21 mm) of the surface (635) is approximately 0.5 mm. The Fresnel structure (681) in FIG. 6B corresponds to a region (711) in FIG. 7. The center region (683) without a Fresnel structure corresponds to a region (712) in FIG. 7. As seen from FIGS. 6B, 6C, and 7, incorporating the Fresnel structure (681) into the first lens (631(*a*)) can flatten the first lens (631(*a*)), resulting in a more uniform thickness profile, and the first thickness ratio of the first lens (631(*a*)) is closer to 1/1 than that of the first thickness ratio of the first lens (131(*a*)).

The above description of the surface (635) and the first lens (631(*a*)) can be applied to the surface (672) and the second lens (631(*b*)). A surface curvature of the surface (172) of the second lens (131(*b*)) shown in FIG. 1 can be preserved by the grooved surface (672) of the second lens (631(*b*)), and the second lens (631(*b*)) can have a same or similar focal length as that of the second lens (131(*b*)). In the example of FIGS. 6B-6C, a center portion (or the center region) of the second lens (631(*b*)) that matches the center portion (683) is smooth and does not include a Fresnel structure, and a Fresnel structure that matches the Fresnel structure (681) can surround the center region (683). In an embodiment, the center portion (or the center region) of the second lens (631(*b*)) that is smooth is within the FOV threshold (e.g., an FOV of 70°), and the Fresnel structure that matches the Fresnel structure (681) that surrounds the center region can be outside the FOV threshold. As seen from FIGS. 6C and 7, incorporating the Fresnel structure that matches the Fresnel structure (681) into the second lens (631(*b*)) can flatten the second lens (631(*b*)), resulting in a more uniform thickness profile, and the second thickness ratio of the second lens (631(*b*)) is closer to 1/1 than that of the second thickness ratio of the second lens (131(*b*)) in FIG. 1.

The above description of the surface (635) and the first lens (631(*a*)) can be applied to the surface (637) and the third lens (632). A surface curvature of the surface (137) of the third lens (132) shown in FIG. 1 can be preserved by the discontinuous surface (637) of the third lens (632), and the third lens (632) can have a same or similar focal length as that of the third lens (132).

Figure 8:
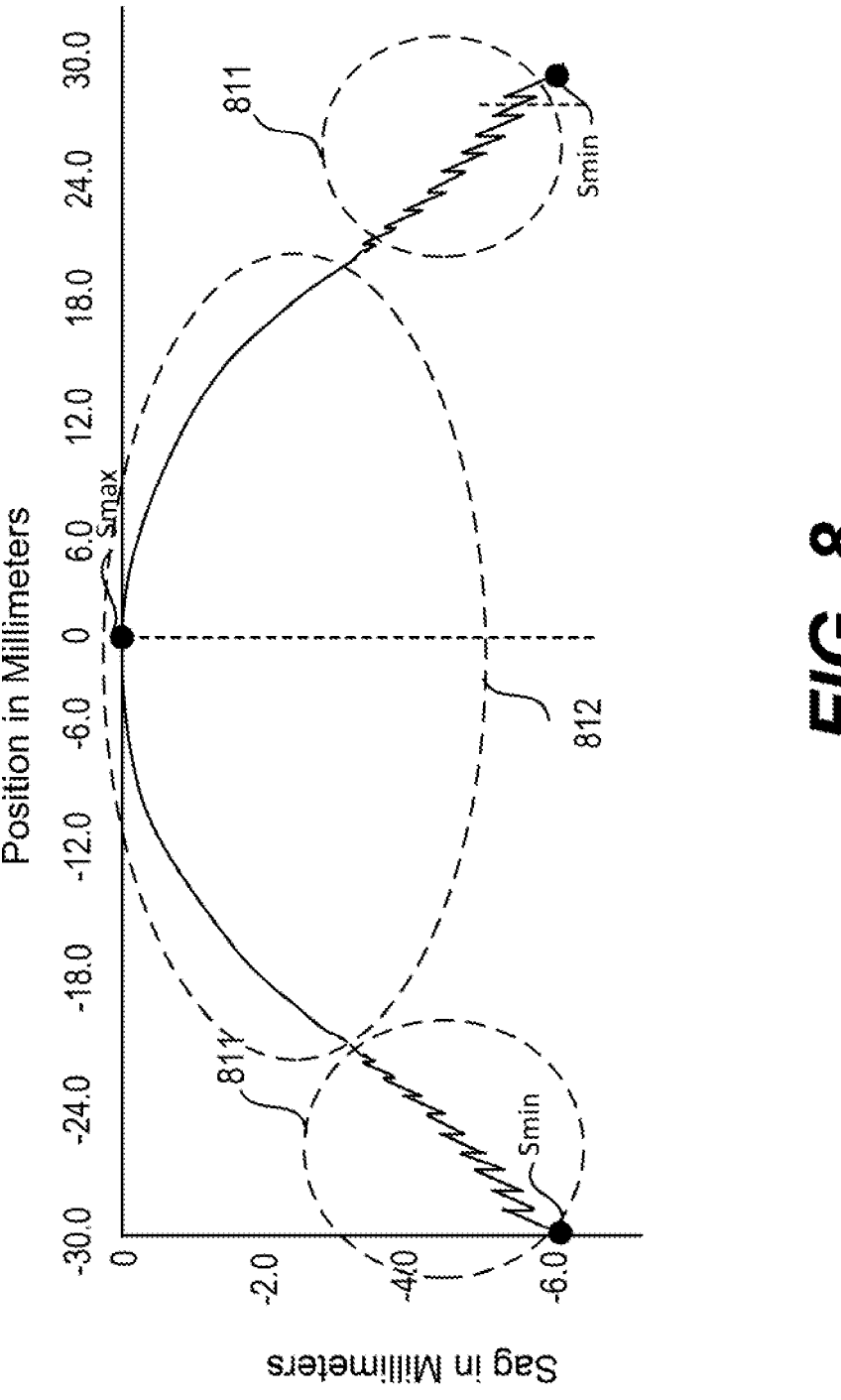
FIG. 8 shows a relationship between a sag (in mm) of a surface and a position along an axis that is perpendicular to the optical axis according to an embodiment of the disclosure.

FIG. 8 shows a relationship between a sag (in mm) of the surface (637) and a position along an axis (e.g., Y axis) that is perpendicular to the optical axis (660). In an example, the sag indicates a distance along the optical axis (660) between a line (674) and a respective point on the curve (637) formed by an intersection of the surface (637) of the third lens (632) and the YZ plane. The line (674) passes through a vertex V1 of the surface (637) and is tangential to the surface (637). Referring to FIG. 8, the position of V1 is 0 mm, and the sag at V1 is 0 mm. In FIG. 8, a sagitta difference (or a maximum sagitta difference) between (i) a minimum sagitta $S_{min}$ (e.g., at about 30 mm or −30 mm) of the surface (637) and (ii) a maximum sagitta $S_{max}$ (e.g., at 0 mm) of the surface (637) is approximately 6 mm. The Fresnel structure (682) in FIGS. 6B-6C corresponds to a region (811) in FIG. 8. The center region (684) that is smooth without a Fresnel structure corresponds to a region (812) in FIG. 8. As seen from FIGS. 6C and 8, incorporating the Fresnel structure (682) into the third lens (632) can flatten the third lens (632), resulting in a more uniform thickness profile, and the third thickness ratio of the third lens (632) is closer to 1/1 than that of the third thickness ratio of the third lens (132).

Referring to FIG. 6C, the center portion (or the center region) (684) of the third lens (632) is smooth and does not include a Fresnel structure, and the Fresnel structure (682) can surround the center region (684). The center portion (or the center region) (684) of the third lens (632) within the FOV threshold (e.g., an FOV of 70°) does not include a Fresnel structure. The Fresnel structure (682) that surrounds the center region (684) can be disposed outside the FOV threshold. A size (e.g., a diameter) of the center region (684) can depend on the FOV threshold (e.g., 70°). In an example, the size of the center region (684) depends on the FOV threshold (e.g., 70°) and the distance D3 (or the eye relief). The size of the center region (684) can increase with the FOV threshold (e.g., 70°) and the distance D3 (or the eye relief).

Referring back to FIG. 6B, a first chromatic aberration of the first lens (631(*a*)) can be complementary to (e.g., opposite to) a second chromatic aberration of the second lens (631(*b*)). The second chromatic aberration can be reduced by the first chromatic aberration. A chromatic aberration of the achromatic lens (631) can be less than the first chromatic aberration or the second chromatic aberration.

The surfaces (635)-(638) and (671)-(672) can have any suitable shapes, such as planar shape(s) parallel to the XY plane, spheric shape(s) with any suitable radius of curvature, aspheric shape(s), or other shape(s). Shapes of the surfaces (635)-(638) and (671)-(672) can be determined based on design parameters, such as thickness ratios of the first lens (631(*a*)), the second lens (631(*b*)), and the third lens (632), focal lengths, aberration requirements, lens thicknesses, and the like. The first lens (631(*a*)) can be a plano-aspheric negative lens, for example, the surface (636) is planar and the surface (635) is aspheric, such as shown in FIGS. 6C and 7. In the example shown in FIG. 6B, the reflective polarizer (639) is disposed onto the surface (636).

The surface (672) of the second lens (631(*b*)) can be aspheric. A shape of the surface (672) of the second lens (631(*b*)) can match a shape of the surface (635) of the first lens (631(*a*)). The surface (671) of the second lens (631(*b*)) can be spheric or aspheric. In an example, the second lens (631(*b*)) is an aspheric-aspheric positive lens.

The third lens (632) can be a spheric-spheric lens, a plano-spheric lens, an aspheric-spheric lens, an aspheric-aspheric lens, or the like. The third lens (632) can be referred to as a BS lens, for example, when the BS (641) is disposed onto one of the surfaces (637)-(638). In the example shown in FIG. 6B, the BS (641) is disposed onto the surface (638).

The description of the optically transparent members (145)-(147), the surface (136), the surface (171), the surface (138), the beam splitter (141), the reflective polarizer (139), the QWP (142), the display device (120), the area (151), the controller (180), and the shift block (170) in FIG. 1 can be applied to the optically transparent members (645)-(647), the surface (636), the surface (671), the surface (638), the beam splitter (641), the reflective polarizer (639), the QWP (642), the display device (620)), the area (651), the controller (680), and the shift block (670) in FIG. 6B, respectively. In another example, the quarter-wave plate (642) is formed over the surface (636). The light rays (121)-(123) and the subset (124) of the light rays in FIG. 6B are described in FIG. 1. A folded path (625) in FIG. 6B can be between the BS (141) and the reflective polarizer (639) and the descriptions for the folded path (125) can be suitably adapted for the folded path (625). The distances D3-D5 in FIG. 6B are described in FIG. 1.

Positions of the beam splitter (641) and the reflective polarizer (639) can be interchangeable, and the above descriptions of the optical path can be suitably adapted. For example, the reflective polarizer (639) is disposed between the display device (620) and the beam splitter (641). In an example, the reflective polarizer (639) is disposed on the surface (638) of the third lens (632), and the beam splitter (641) is disposed on the surface (636) of the first lens (631(a)). The QWP (642) can be disposed on the surface (636). The optical cavity is formed between the reflective polarizer (639) disposed on the surface (638) and the beam splitter (641) disposed on the surface (636). The light beams emitted from the pixels (e.g., including the pixel A) in the display device (120) can be linearly polarized, for example, in the first linear polarization state. The light beams then pass through the second lens (632) and are incident onto the reflective polarizer (639). The reflective polarizer (639) can transmit the light beams having the first linear polarization state with a relatively high transmittance that is above or equal to a value (e.g., 90%) over a wavelength range (e.g., 380 to 780 nm). Then light beams pass the optical cavity for the first time and are incident onto the beam splitter (141) that partially transmits the light beams and partially reflects the light beams back to the optical cavity. Then the light beams that are reflected back by the beam splitter (641) pass the optical cavity for the second time. During both the first pass and the second pass, the QWP (642) alters the polarization state of the light beams. Accordingly, the first linear polarization state of the light beams is converted to the second linear polarization state by the QWP (642). The second linear polarization state is along the block direction of the reflective polarizer (639). After the second pass, the light beams are incident onto the reflective polarizer (639). The light beams are blocked by the reflective polarizer (639) and are not transmitted through the reflective polarizer (639). The reflective polarizer (639) can reflect the light beams having the second linear polarization state, for example, with a relatively high average reflectance that is above or equal to a value (e.g., 90%) over a wavelength range (e.g., 380 to 780 nm). Then the light beams pass the optical cavity for the third time and are incident onto the beam splitter (641). The light beams can be partially transmitted by the beam splitter (641) and are directed to the area (651).

Material(s) in the optically transparent member (645) can be different from material(s) in the optically transparent member (647) such that the first chromatic aberration of the first lens (631(a)) is complementary to the second chromatic aberration of the second lens (631(b)).

An Abbe number of a material can indicate a dispersion or a chromatic dispersion (e.g., a variation of a refractive index with a wavelength) of the material. In an embodiment, a larger value of the Abbe number indicates a lower dispersion. The achromatic lens (631) can be formed from two different materials having different Abbe numbers (indicating two different dispersions). In an embodiment, the first lens (631(a)) is a negative lens and the optically transparent member (645) has a first Abbe number, and the second lens (631(b)) is a positive lens and the optically transparent member (647) has a second Abbe number. The second Abbe number can be larger than the first Abbe number. The chromatic dispersion of the optically transparent member (647) (or the second lens (631(b))) can be less than the chromatic dispersion of the optically transparent member (645) (or the first lens (631(a))).

In some embodiments, a lens that is to have low birefringence (e.g., the first lens (631(a)), the second lens (631(a)), or the third lens (632)) is made with injection molding. To form the lens with low birefringence, a suitable mold flow or a good mold flow (e.g., a relatively smooth mold flow) is to be used. As described above, a suitable mold flow can be achieved without annealing, for example, when a thickness ratio of a lens, such as a ratio of an edge thickness of the lens over a center thickness of the lens, is within a certain range, such as close to 1/1.

Referring to FIG. 6C, the first lens (631(a)) can be formed by injection molding using material(s), such as polycarbonate. The first lens (631(a)) is to have low birefringence. In an example, the first lens (631(a)) is a concave lens. The good mold flow (e.g., the relatively smooth mold flow) can be achieved without annealing, for example, if the first thickness ratio of the first lens (631(a)) (e.g., a ratio of an edge thickness of the first lens (631(a)) over a center thickness of the first lens (631(a))) is within the first range R1, such as from 1 to 1.2. In the example shown in FIG. 6C, the first thickness ratio is 1/1 or is approximately 1/1, a good mold flow can be achieved without annealing.

The second lens (631(b)) can be formed by injection molding. The second lens (631(b)) is to have low birefringence. In an example, the second lens (631(b)) is a convex lens. The suitable mold flow (e.g., the relatively smooth mold flow) can be achieved, for example, if the second thickness ratio of the second lens (631(b)) (e.g., a ratio of an edge thickness of the second lens (631(b)) over a center thickness of the second lens (631(b))) is within the second range R2, such as from 1/3 to 1/1. Referring to FIG. 6C, the second thickness ratio of the second lens (131(b)) is 1/3 or is approximately 1/3, a good mold flow can be achieved without annealing.

The above description regarding the second lens (631(b)) can be applicable to the third lens (632) that is a convex lens in the example shown in FIG. 6C. A suitable mold flow (e.g., a relatively smooth mold flow) can be achieved, for example, if the third thickness ratio of the third lens (632) (e.g., a ratio of an edge thickness of the third lens (632) over a center thickness of the third lens (632)) is within the third range R3, such as from 1/3 to 1/1. Referring to FIG. 6C, the third thickness ratio of the third lens (632) is 1/1 or is approximately 1/1, a good mold flow can be achieved without annealing. The edge thicknesses of the second lens (631(b)) and the third lens (632) are thick enough to allow a good mold flow.

An achromatic lens (e.g., 131 or 631) can include a negative lens (e.g., 131(a) or 631(a)) and a positive lens (e.g., 131(b) or 631(b)). Various methods can be used to fabricate the achromatic lens. In an example, the negative lens is bonded with the positive lens using liquid optical clear adhesive. In another example, a first one of the negative lens and the positive lens can be a molded lens, and a second one of the negative lens and the positive lens can be molded over the first one to produce the achromatic lens that is a single hybrid lens. In an example, the first one is the negative lens and the second one is the positive lens.

In an example, system parameters of the display system (600) are identical or similar to those of the display system (100). The distance D3 (or the eye relief) between the area (651) and the last optical component (e.g., the achromatic lens (631)) in the optical system (610) before the area (651) is 14 mm. The distance D4 (i.e., the lens track length) between the display device (620) and the achromatic lens (631) is 19.5 mm. The display size is indicated by a display image circle that is imaged by the optical system (610) onto the area (651), and the display image circle has a radius of 18.9 mm. A size (e.g., pupil size) of the area (651) is 5 mm. A FOV of the optical system (610) is 110°. The optical system (610) can form the virtual image (699) from an image on the display device (620) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

Embodiments in the disclosure describe the achromatic lens (631) that includes the first lens (631(a)) and the second lens (631(b)) that are attached to each other. The descriptions can be suitably applied to a lens combination of (i) a first lens that is identical or similar to the first lens (631(a)) and (ii) a second lens that is identical or similar to the second lens (631(b)) where the first lens and the second lens are separated by a gap. The lens combination can have a smaller achromatic aberration than an achromatic aberration of the first lens and an achromatic aberration of the second lens.

Embodiments in the disclosure may be used separately or combined in any order.

In an embodiment, a polarized catadioptric VR optical system, such as the display system (600), can utilize an achromatic lens comprising a Fresnel optical element. Using the achromatic lens comprising a negative Fresnel lens can allow a compact lens shape that is more compatible to certain fabrication methods (e.g., injection molding).

The display system (600) can include one or more Fresnel lenses having Fresnel structure(s). When compared with a lens having an identical or similar focusing power, a thickness variation of a Fresnel lens can be more uniform than that of the lens without a Fresnel structure, and the Fresnel lens can be more flattened than the lens without a Fresnel structure. Accordingly, the Fresnel lens can be fabricated more easily and/or with low birefringence in various embodiments. The display system (600) including the one or more Fresnel lenses can have identical or similar parameters (e.g., a FOV, an eye relief, a lens track length, a display size, and the like) as those of the display system (100) without a Fresnel lens. The lens system (630) in the display system (600) can be fabricated more easily, with better quality than the lens system (130) in the display system (100), and/or in a more compact package.

A computer or computer-readable medium can control various aspects of an HMD system in which a display system (e.g., (100) or (600)) including an optical system (e.g., (110) or (610)) is incorporated. Various aspects of the display system including controlling movements and positioning of the optical components (e.g., the achromatic lens (131) or (631), the third lens (132) or (632), the display device (120) or (620)) can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
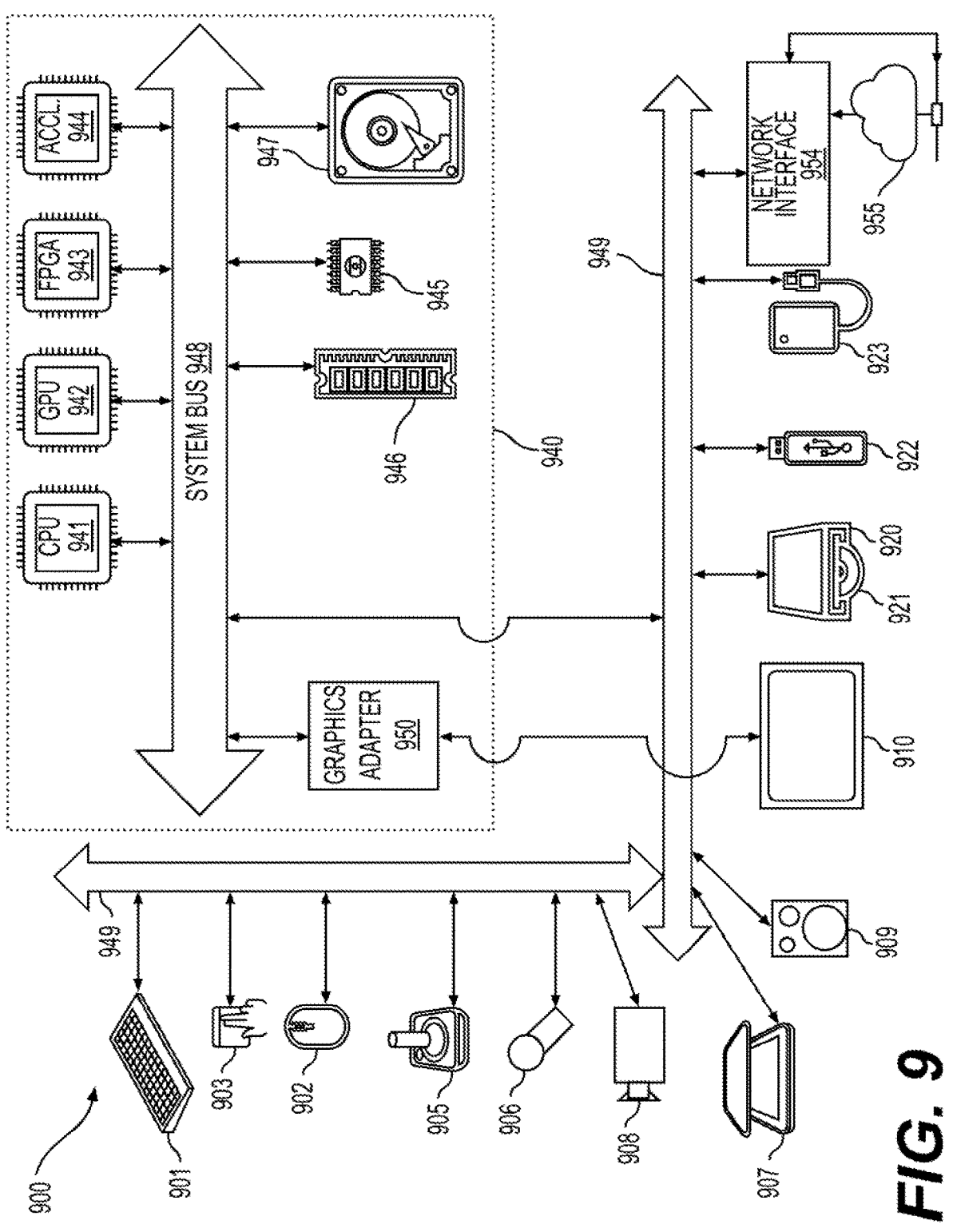
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch-screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as touch-screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, graphics adapters (950), and so forth. These devices, along with Read-only memory (ROM) (945), Random-access memory (946), internal mass storage (947) such as internal non-user accessible hard drives, SSDs, and the like, may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the touchscreen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (900) having architecture, and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An achromatic lens, comprising:
a first lens with a negative focal length including a first optically transparent member having a first surface and a second surface, and
a second lens attached to the first lens at the second surface, the second lens having a positive focal length including a second optically transparent member having a third surface and a fourth surface, wherein
a second chromatic aberration of the second lens is reduced by a first chromatic aberration of the first lens,
the second surface of the first lens includes (i) a center region without a Fresnel structure and (ii) a first Fresnel structure that surrounds the center region, and
a size of the center region depends on a field of view (FOV) threshold of a light receiver and a distance between the light receiver and the first lens.
2. The achromatic lens according to claim 1, wherein the second surface is an aspheric surface.

3. The achromatic lens according to claim 1, wherein
a first ratio of an edge thickness of the first lens over a
center thickness of the first lens is between 1 to 1.2, and
a second ratio of an edge thickness of the second lens over
a center thickness of the second lens is between 1/3 to
1.

4. A lens system comprising:
an achromatic lens including
a first lens with a negative focal length including a first
optically transparent member having a first surface
and a second surface, and
a second lens attached to the first lens at the second
surface, the second lens having a positive focal
length including a second optically transparent member having a third surface and a fourth surface, and
a third lens with a positive focal length including a third
optically transparent member having a fifth surface and
a sixth surface, the sixth surface having a second
Fresnel structure, wherein
a second chromatic aberration of the second lens is
reduced by a first chromatic aberration of the first lens,
the second surface of the first lens includes (i) a center
region without a Fresnel structure and (ii) a first Fresnel
structure that surrounds the center region, and
a size of the center region depends on a field of view
(FOV) threshold of a light receiver and a distance
between the light receiver and the first lens.

5. The lens system according to claim 4, wherein
the sixth surface includes (i) a center region without a
Fresnel structure and (ii) the second Fresnel structure
that surrounds the center region of the sixth surface.

6. The lens system according to claim 4, wherein
a first ratio of an edge thickness of the first lens over a
center thickness of the first lens is between 1 to 1.2,
a second ratio of an edge thickness of the second lens over
a center thickness of the second lens is between 1/3 to
1, and
a third ratio of an edge thickness of the third lens over a
center thickness of the third lens is between 1/3 to 1.

7. An optical system, comprising:
the lens system according to claim 5,
a beam splitter configured to partially transmit and partially reflect light beams from a display device,
a reflective polarizer configured to pass through light
having a first linear polarization state and reflect light
having a second linear polarization state that is
orthogonal to the first linear polarization state, and
a quarter waveplate (QWP) that is positioned between the
beam splitter and the reflective polarizer, wherein
the QWP is on a surface of the first lens, the second lens,
or the third lens,
the beam splitter is on the fifth surface of the third lens,
and
the reflective polarizer is on the first surface of the first
lens.

8. The optical system according to claim 7, wherein
the optical system includes the display device, a pixel
array in the display device being configured to generate
light beams, a polarization state of the light beams
being a first circular polarization state,
the third lens is positioned between the display device and
the achromatic lens, the fifth surface of the third lens
being configured to face the display device, and
the second lens is positioned between the first lens and the
third lens, the third surface of the second lens being
configured to face the third lens.

9. An optical system, comprising:
the lens system according to claim 5,
a beam splitter configured to partially transmit and partially reflect light beams from a display device,
a reflective polarizer configured to pass through light
having a first linear polarization state and reflect light
having a second linear polarization state that is
orthogonal to the first linear polarization state, and
a quarter waveplate (QWP) that is positioned between the
beam splitter and the reflective polarizer, wherein
the QWP is on a surface of the first lens, the second lens,
or the third lens,
the reflective polarizer is on the fifth surface of the third
lens, and
the beam splitter is on the first surface of the first lens.

10. The optical system according to claim 9, wherein
the optical system includes the display device, a pixel
array in the display device being configured to generate
light beams, a polarization state of the light beams
being the first linear polarization state,
the third lens is positioned between the display device and
the achromatic lens, the fifth surface of the third lens
being configured to face the display device, and
the second lens is positioned between the first lens and the
third lens, the third surface of the second lens being
configured to face the third lens.

11. An optical system, comprising:
a lens system including an achromatic lens, the achromatic lens including
a first lens with a negative focal length including a first
optically transparent member having a first surface
and a second surface, and
a second lens attached to the first lens at the second
surface, the second lens having a positive focal
length including a second optically transparent member having a third surface and a fourth surface,
wherein
a second chromatic aberration of the second lens is
reduced by a first chromatic aberration of the first lens,
the second surface of the first lens includes (i) a center
region without a Fresnel structure and (ii) a first Fresnel
structure that surrounds the center region,
the lens system is configured to direct light beams from a
display device to a light receiver, and
a size of the center region depends on a field of view
(FOV) threshold of the light receiver and a distance
between the light receiver and the first lens.

12. The optical system according to claim 11, wherein
the second surface is an aspheric surface.

13. The optical system according to claim 11, wherein
a first ratio of an edge thickness of the first lens over a
center thickness of the first lens is between 1 to 1.2, and
a second ratio of an edge thickness of the second lens over
a center thickness of the second lens is between 1/3 to
1.

14. The optical system according to claim 11, wherein
the lens system includes a third lens with a positive focal
length, and
the third lens includes a third optically transparent member having a fifth surface and a sixth surface, the sixth
surface having a second Fresnel structure.

15. The optical system according to claim 14, wherein
the sixth surface includes (i) a center region without a
Fresnel structure and (ii) the second Fresnel structure
that surrounds the center region of the sixth surface.

16. The optical system according to claim 14, wherein
a first ratio of an edge thickness of the first lens over a
center thickness of the first lens is between 1 to 1.2, a second ratio of an edge thickness of the second lens over a center thickness of the second lens is between 1/3 to 1, and a third ratio of an edge thickness of the third lens over a center thickness of the third lens is between 1/3 to 1.

17. The optical system according to claim 14, further comprising:

a beam splitter configured to partially transmit and partially reflect light beams from the display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer, wherein the QWP is on a surface of the first lens, the second lens, or the third lens, the beam splitter is on the fifth surface of the third lens, and the reflective polarizer is on the first surface of the first lens.

18. The achromatic lens according to claim 1, wherein the FOV threshold is approximately 70° along an axis that is perpendicular to an optical axis of the achromatic lens.

19. The achromatic lens according to claim 1, wherein the first Fresnel structure is configured to refract light that is incident onto the first Fresnel structure.

*   *   *   *   *